United States Patent
Schwartz et al.

(10) Patent No.: US 11,113,155 B1
(45) Date of Patent: Sep. 7, 2021

(54) ARCHIVING AND RESTORATION OF DISTRIBUTED DATABASE LOG RECORDS

(71) Applicant: Amazon Technologies, Inc., Seattle, WA (US)

(72) Inventors: Benjamin Aldouby Schwartz, East Palo Alto, CA (US); Serj Kazar, Los Angeles, CA (US); Dumanshu Goyal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 235 days.

(21) Appl. No.: 15/789,598

(22) Filed: Oct. 20, 2017

Related U.S. Application Data (63) Continuation of application No. 14/745,260, filed on Jun. 19, 2015, now Pat. No. 9,823,982.

(51) Int. Cl.
| | | |
|---|---|---|
| *G06F 16/11* | (2019.01) | |
| *G06F 16/185* | (2019.01) | |
| *G06F 11/14* | (2006.01) | |
| *G06F 16/182* | (2019.01) | |
| *G06F 16/22* | (2019.01) | |

(52) U.S. Cl.
CPC ...... *G06F 11/1469* (2013.01); *G06F 11/1451* (2013.01); *G06F 11/1464* (2013.01); *G06F 16/113* (2019.01); *G06F 16/128* (2019.01); *G06F 16/183* (2019.01); *G06F 16/185* (2019.01); *G06F 16/2255* (2019.01); *G06F 2201/80* (2013.01); *G06F 2201/84* (2013.01)

(58) Field of Classification Search
CPC .............................. G06F 16/113; G06F 16/185
See application file for complete search history.

(56) References Cited

U.S. PATENT DOCUMENTS

| | | | |
|---|---|---|---|
| 6,279,007 B1 | 8/2001 | Uppala | |
| 7,552,125 B1 | 6/2009 | Evans | |
| 8,224,935 B1 | 7/2012 | Bandopadhyay et al. | |
| 8,326,839 B2 | 12/2012 | Idicula et al. | |
| 8,683,020 B2 | 3/2014 | Tucker et al. | |
| 9,384,200 B1 * | 7/2016 | Batchu | G06F 11/1435 |
| 2009/0182730 A1 | 7/2009 | Krishnamoorthy et al. | |
| 2010/0306193 A1 | 12/2010 | Pereira et al. | |
| 2014/0089459 A1 * | 3/2014 | Werr | H04L 67/06 709/217 |
| 2016/0019274 A1 * | 1/2016 | Sanso | G06F 16/958 707/634 |

\* cited by examiner

*Primary Examiner* — Kris E Mackes
(74) *Attorney, Agent, or Firm* — Davis Wright Tremaine LLP (57) ABSTRACT

Transactional log data for a distributed database may be archived by a number of computing nodes scalable to a specified concurrency parameter. A log record may be mapped to a computing node for performance of an archiving operation. The log record may be stored with information indicative of a position, in a hierarchy of shards, of the shard from which the log record originated. The log record may be replayed in an order, relative to other records, that is based on the shard's position in the shard hierarchy. The log record may be replayed on a shard identified based on a time-invariant and idempotent hash function.

20 Claims, 9 Drawing Sheets

ARCHIVING AND RESTORATION OF DISTRIBUTED DATABASE LOG RECORDS

CROSS REFERENCE TO RELATED APPLICATIONS

The present application is a continuation of U.S. patent application Ser. No. 14/745,260, entitled "ARCHIVING AND RESTORATION OF DISTRIBUTED DATABASE LOG RECORDS", filed Jun. 19, 2015, the contents of which are hereby incorporated by reference in entirety.

BACKGROUND

Changes to data maintained in a distributed database system may be represented by a collection of log files. Each shard of the distributed database may maintain its own log file representing changes to the data maintained by that particular shard. A typical distributed database may contain a large number of shards and may process a high volume of requests to change data. Consequently, the collection of log files may grow to be quite large.

As with other types of database systems, there are typically a number of reasons to create backups of these log files. A backup could, for example, be used to restore the distributed database to a prior state in the event of a system failure. A backup might also be used to duplicate an existing database, or to transfer the data maintained in one distributed database to another system. However, due to the number and size of the log files in a typical distributed database system, the process of creating an archive may take a considerable length of time.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Disclosed herein are systems and methods for archiving transaction log records obtained from a distributed database system, and restoring the archived transaction log records to a distributed database system. The disclosed systems and methods may involve parallelization of the archival process to increase efficiency of the archiving. The archived transaction log may be restored to a distributed database with a higher or lower degree of parallelization than the distributed database that was the source of the archive.

In an example system, a distributed database may consist of a plurality of computing nodes on which shards of the distributed database are hosted. Each computing node may, for example, host one shard. Associated with each shard is a transactional log that describes a history of changes made to the data maintained within the log. These changes may be described by log records. The log records may typically contain a primary key value that identifies the data item to which the log record pertains, and a description of the change. The description can, for example, include information that indicates whether the data item is being inserted, deleted, or modified.

A second plurality of computing nodes may be used to archive the transactional logs. The time needed to perform the archival process may be reduced by increasing the number of computing nodes on which the archival process will be performed. The archiving process may therefore have a greater degree of parallelization than the distributed database.

Data from the transactional logs may be provided to an archiving module via a set of streams. Each stream may correspond to a shard in the distributed database. In order to increase parallelization of the archiving, records received via the stream may be mapped to one of a number of computing nodes in the archiving module. Each shard in the distributed database may, for example, be mapped to two or more computing nodes that will perform the archiving process for that shard.

The shards in a distributed database may have various interrelationships that may be described as a lineage or a hierarchy. The archiving module may preserve information about the hierarchy during the archival process. The preserved information can, for example, describe parent and child relationships between the shards in the distributed database.

A restoration module may retrieve the log records and apply them to a distributed database in order to replicate the data that was maintained in the original source distributed database. When a log record is applied to a shard in a distributed database, the shard may insert, update, or delete the corresponding data item and update its own transactional log to reflect the change. Applying the log records to the distributed database in this manner may be referred to as replaying the log. Replaying the log may comprise transmitting archived log records to a shard and causing the record to be applied. Typically, applying the record may involve inserting, updating, or deleting a data item. In order to preserve the correctness of the data, the replay process may proceed by replaying all records associated with a level of the hierarchy prior to replaying records in another level.

The log records may be mapped during replay to a distributed database that has the same number, or a different number, of shards than the original source of the archived transaction log data. A time-invariant and idempotent hash function may be used to map a portion of each log record, such as the primary key of the data item the log record represents, to a position in a hash space. The hash space may be divided into regions, where each region represents a copy of the shard hierarchy. Each region may in turn be divided into sub-regions, where each sub-region corresponds to a particular shard in the hierarchy. Because the hash function is time-invariant and idempotent, all log records corresponding to a particular item are mapped to the same shard within the same hierarchy.

Figure 1:
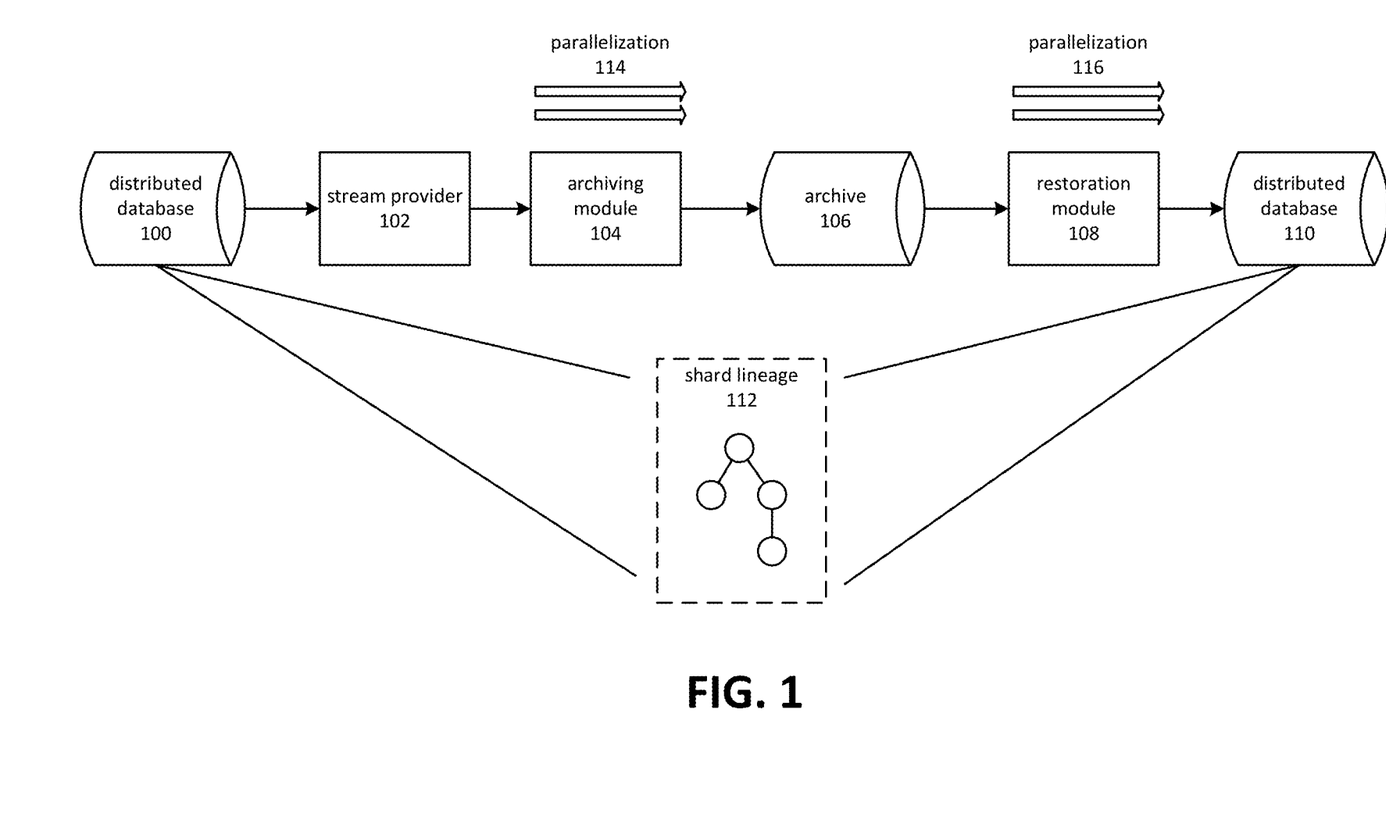
FIG. 1 is a block diagram depicting an example system for parallelized archiving and restoring of log data.

FIG. 1 is a block diagram depicting an example system for parallelized archiving and restoring of log data. A distributed database 100 may consist of some number of computing nodes that host shards. Each shard may host a portion of the data maintained by the database. The data in the database may be, for example, horizontally or vertically partitioned. Moreover, in some instances a shard may maintain a full copy of the database schema.

The shards in the distributed database 100 may be related to each other. There may be, for example, replication relationships between the various shards that make the distributed database 100. A shard may be, in some instances, considered the parent of another shard, the child of another shard, or a sibling of another shard. The shards in a distributed database may therefore be associated with a shard lineage 112 or some other hierarchical relationship between the shards.

An archive 106 may comprise, in some instances, a distributed storage system. In other instances, it could comprise other various storage mechanisms, such as storage area networks, arrays of optical storage mechanism, and so forth. Typically, the storage technology on which the archive 106 relies may be selected based on the technology having a relatively low cost per unit of storage as compared to the distributed database 100. The archive 106 may be utilized to provide longer-term storage of the data maintained by the distributed database 100. For example, the archive 106 may be intended to maintain snapshots or incremental copies of the data maintained on the distributed database 100. In some instances, it may be intended for the data maintained on the archive 106 to be restored back to the distributed database 100. Note that, for explanatory purposes, FIG. 1 depicts a second distributed database 110 as the target of a restoration process. In practical embodiments, the distributed databases 100 and 110 may be the same distributed database systems, or they may be distinct.

The distributed database 100 may maintain transactional logs containing a history of changes made to the data maintained by each shard in the database 100. The transactional logs may be used as a source of data for storing in the archive 106. The amount of data available from the log may be, in some instances, limited to some interval, such as the most recent 24-hour period.

The stream provider 102 may provide stream-based access to the logs. The stream provider 102 may provide, for example, a stream for each shard in the database. With respect to an individual shard, one approach to archiving the data could involve directly storing a history of changes for the shard, and subsequently replaying that history when the archive is being restored. With respect to the single partition, this approach may produce a copy of the archived version of the database, provided that the replay of the archive started from a baseline common to both the source shard and the destination shard. However, the situation with respect to the distributed database 100 is more complex, since there is a relationship between the shards, depicted as the shard lineage 112 in FIG. 1.

Another factor that may arise if the streams were archived directly is that the speed of the operation might be limited. For example, if the distributed database 100 contained four shards, and the stream provider 102 produced four streams, the speed at which data could be archived might be limited to the rate at which four consumers of the streams could archive the data. Typically, the rate might be limited based on factors such as the speed of the archive 106 in processing storage operations. Consequently, the archiving module 104 might employ parallelization 114 in order to process a greater number of streams. The amount of parallelization employed may be expressed as a concurrency parameter, which might in some instances be a multiplying factor. For example, the archiving module 104 might employ a concurrency parameter of "3," meaning that instead of processing the four streams produced by the stream provider 102 in four parallel threads, it instead does so in 12 parallel threads.

A restoration module 108 may also employ parallelization 116 during the restoration process. However, due to the interrelationships associated with the shard lineage 112, the restoration module 108 may employ certain techniques, described herein, to replay the archived log data in a manner that preserves the integrity of the data. This preservation of the integrity of the data is depicted in FIG. 1 by the indication that the shard lineage 112 is preserved in the destination distributed database 110. Note that in some instances the number of shards in the target distributed database 110 might be different that the number of shards in the source distributed database 100, and accordingly the lineage in the target distributed database 110 might appear to be different than in the shard lineage 112 of the source distributed database 100. However, the restoration module 108 may ensure that the integrity of the data is preserved by considering the shard lineage 112 during the restoration process.

Figure 2:
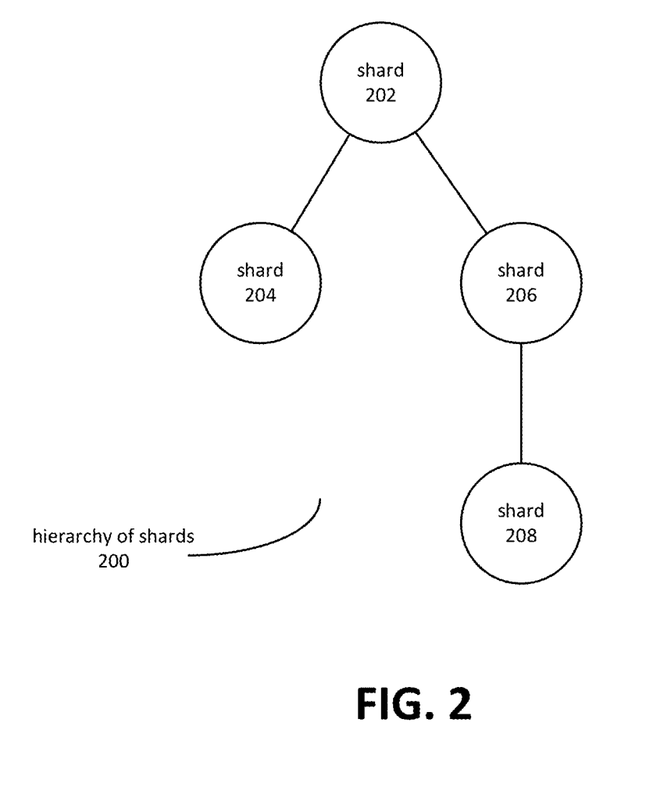
FIG. 2 is a block diagram depicting interrelationships between shards in a distributed database.

FIG. 2 is a block diagram depicting interrelationships between shards in a distributed database. A distributed database may comprise a number of shards 202-208 on which the data maintained by the distributed database is stored.

The shards 202-208 may have various relationships reflected as a hierarchy of shards 200. The relationships may include parent-child relationships, such as a shard 202 that may be the parent of two shards 204 and 206. Similarly, a shard 206 may have both a parent shard 202 and a child shard 208.

Figure 3:
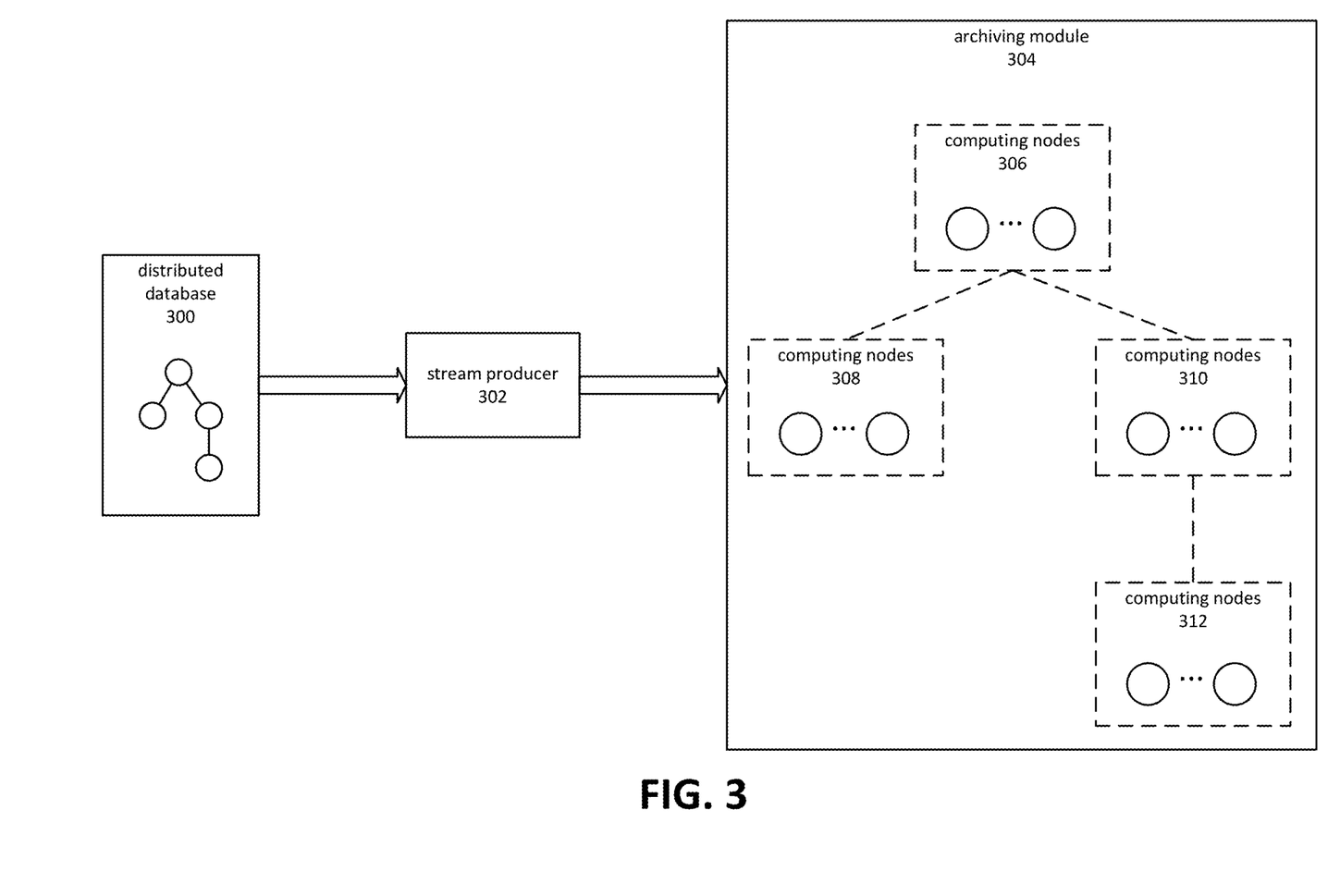
FIG. 3 is a block diagram depicting scaling-out of shards for archiving of a distributed database.

FIG. 3 is a block diagram depicting scaling-out of shards for archiving of a distributed database. A distributed database 300 may comprise shards having hierarchical relationships, such as those depicted in FIG. 2. A stream producer 302 may access the transaction log of each of the shards and provide access to the data via an application programming interface. The data may be provided, for example, via an interface that provides a continuous or semi-continuous stream of data from the transaction log.

The archiving module 304 may include a number of computing nodes for processing requests to store records received from the stream producer 302. In some instances, data may be received by the archiving module 304 from the stream producer 302. The archiving module 304 may, for example, use the application programming interface provided by stream producer 302 to receive a log record from the stream producer 302 and transmit it to an appropriate shard for processing. The data may be routed on a record-by-record basis, based on the content of the record. For example, the data may be routed based on the primary key of a record.

A shard may, upon receiving a record, perform an operation to store the log record within an archive, such as the archive 106 that is depicted in FIG. 1. The shard may, for example, comprise a module of the archiving module 304 that receives the log record and processes it. Among the operations that may be performed on the log record are initiating operations that store the archive and associated metadata in an archive.

It may be the case that data may be received from the stream producer 302 at a rate that is faster than one shard is able to handle. This could occur, for example, if the time required to store data in the archive 106 was relatively long compared to the rate at which records are being received from the stream producer 302. The archiving module 304 may therefore employ additional parallelization. For example, instead of maintaining a one-to-one ratio between shards in the distributed database and shards in the archiving module 304, a one-to-N ratio might be employed. This is depicted in FIG. 3. For example, a group of computing nodes 306 might correspond to a single shard in the distributed database 300. Another set of computing nodes 308 might correspond to another single shard in the distributed database 300. The same might be true for other groups of computing nodes 310 and 312 in the archiving module 304.

In some instances, each group of computing nodes 306-312 may correspond to a shard in the distributed database 300. The groups of computing nodes 306-312 may also correspond to each other in a manner similar to that of the lineage, or other hierarchical relationship, of the shards in the distributed database. For example, referring back to FIG. 2, shard 202 might correspond to the group of computing nodes 306 at the root of the hierarchy. The scaled-out computing nodes 306 might have two groups of computing nodes 308 and 310 as children, just as shard 202 has two shards 204 and 206 as children. Similarly, a group of computing nodes 310 might correspond to a shard 206, which has both a parent shard 202 and a child shard 208. This group of computing nodes 310 might have a parent group of computing nodes 306 and a child group of computing nodes 312.

Figure 4:
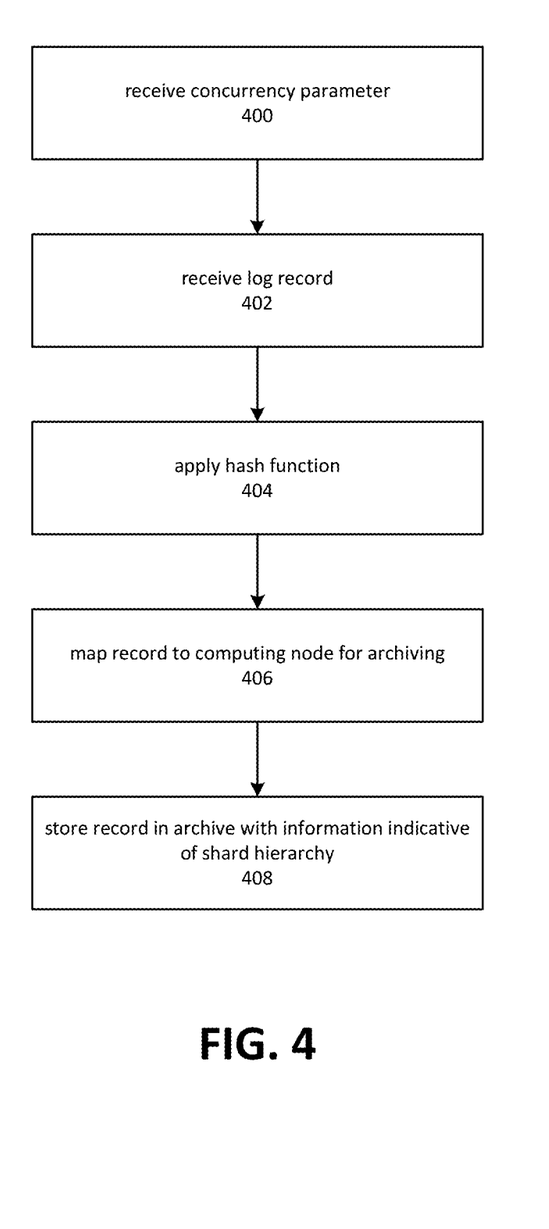
FIG. 4 is a flow diagram depicting an example of a process for archiving data in a distributed database.

The archiving process may be further explained by the example of FIG. 4, which is a flow diagram depicting an example of a process for archiving data in a distributed database. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 400 depicts receiving information indicative of a desired concurrency parameter. For example, referring back to FIG. 1, the archiving module 104 may receive a message or data indicating that processing of a request to archive data in the distributed database 100 should proceed by using a three-to-one ratio of computing nodes that perform archiving operations to shards.

Block 402 depicts receiving a log record of the distributed database 100. The log record might, for example, be sent via a stream provider 102 to the archiving module 104. A relevant portion of the log record may be extracted and used to apply a hash function. Block 404 depicts applying the hash function to a value extracted from the record. In some instances, a primary key associated with the log record may be used. Note that although FIG. 4 depicts the handling of a single record, embodiments may generally process a large number of records. The process depicted by FIG. 4 is intended to facilitate parallel processing of a number of records.

Figure 5:
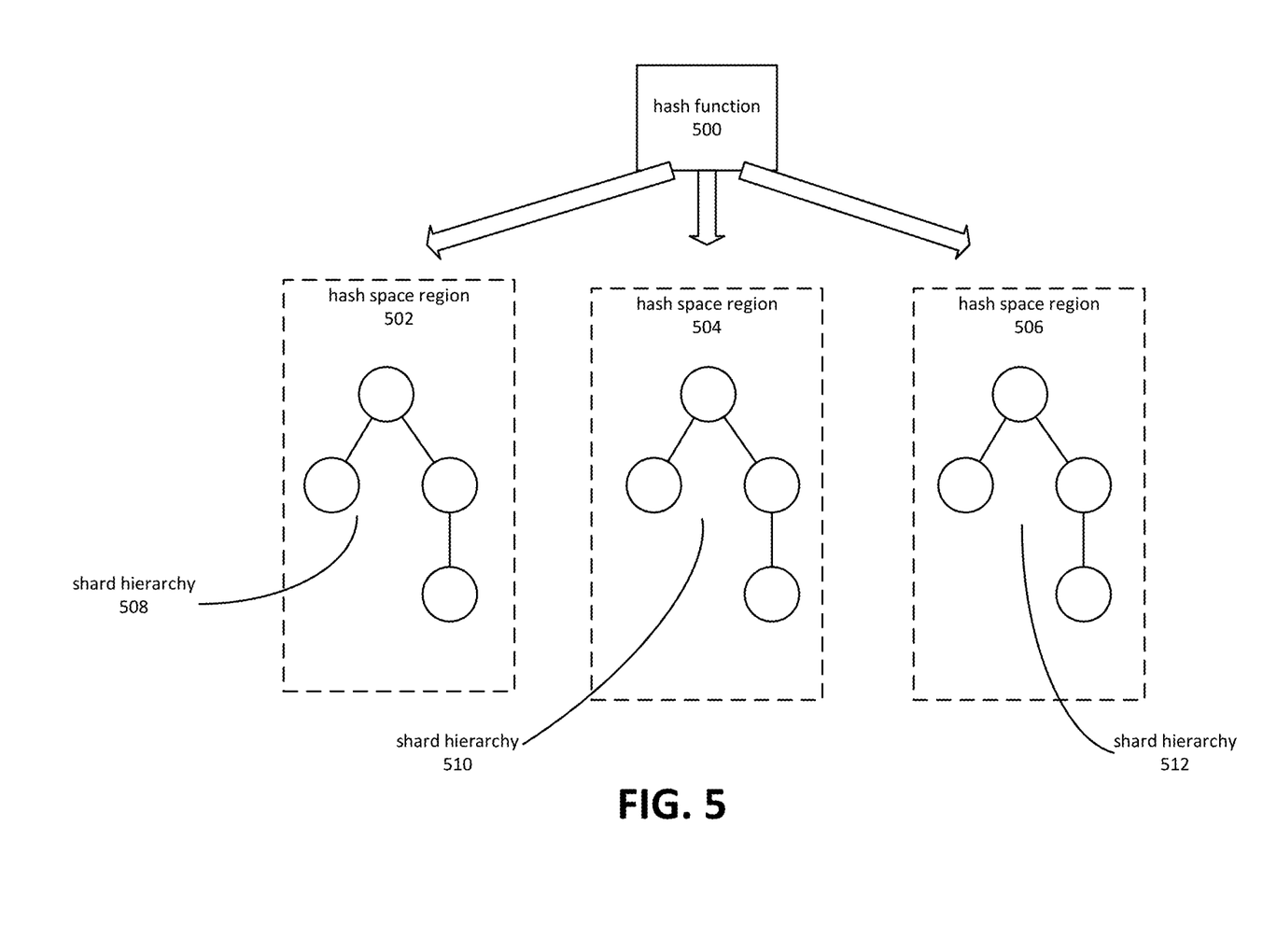
FIG. 5 is a block diagram depicting aspects of a process for shard restructuring.

As depicted by block 406, embodiments may map the log record to a computing node that can perform the archiving operation. The mapping may be based on the application of the hash function to a portion of the log record that is depicted by block 404. In some embodiments, the hash function may be selected to correspond to the hash function used during restoration, such as the hash function 500 that is depicted in FIG. 5. The hash function 500 may be used to extend the relationship seen in the shard hierarchy to the groups of computing nodes that will perform the archiving operations. In various instances, the extension of this relationship into the groups of computing nodes that will perform the archiving operation may be leveraged to improve the operation of a subsequent or contemporaneous replay operation.

In other instances, an alternative hash function or alternate mapping mechanism may be employed. For example, a round-robin approach might be utilized to assign a log record to the computing node that will perform the archiving operation for that record.

In a distributed database, data may be distributed among the various shards based on a hash function or other distribution mechanism. For various reasons, the hash function 500 used as part of the archival process may be an additional hash function, or rather a hash function that is not the same as the hash function used to distribute data among the shards of the distributed database. This may be the case, for example, when the original hash function is not known.

After a computing node has been selected based on the mapping operation depicted by block 406, the archiving module 104 may cause the selected computing node to perform an operation that will cause the log record to be stored in an archive. As depicted by block 408, the log record may be stored with additional information that is indicative of the shard hierarchy. For example, the log record might be stored with information that indicates the position in a shard hierarchy of the shard whose transaction log was the source of the log record that is being archived. The level in the shard hierarchy might also be noted. Embodiments might also store information such as a timestamp associated with the record. Embodiments may, in some instances, omit some or all of this information.

In some instances, the selected computing node may perform an operation other than archiving. The various techniques described herein may be applied where distributed processing of an arbitrary function is desired. For example, embodiments may cause a selected computing node to perform an operation in addition to or instead of an archiving operation. The additional operation might, for example, comprise a transformation or calculation function performed using the log record.

FIG. 5 is a block diagram depicting aspects of a process for shard restructuring. The shard restructuring may be performed in response to a request to replay the log records stored in the archive. The restructuring may involve restoring the shard hierarchy that was originally associated with the shards in the distributed database, or extending that logical relationship into a distributed database that has more or fewer shards than the original.

The restructuring may involve application of a hash function 500 to a portion of the record. For example, referring to FIG. 1, a restoration module 108 might retrieve a log record and apply a hash function to a primary key value that is associated with the record. The hash function may be a time-invariant and idempotent function. The hash function may, for example, provide results that cause the output of the function to be the same regardless of when or the number of times it is approached. This may ensure, for example, that the hash function 500 always maps to the same output regardless of how many times it is invoked, provided of course that the input to the hash function 500 is the same.

The range of output of the hash function 500 may be described as a hash space. The hash space may be subdivided into hash space regions 502-506. The number of regions may be based on a desired level of concurrency for the restructured shards. For example, in FIG. 5, it might be the case that the records are to be restored to a distributed database possessing three times the number of shards than were present in the original distributed database.

The hash space regions 502-506 may be further subdivided in sub-regions that correspond to shard hierarchies 508-512. For example, a hash space region 504 might be subdivided into five sub-regions, each of which corresponds to a shard within the corresponding shard hierarchy 510.

The time-invariant and idempotent hash function may permit a given item to be mapped to the same hierarchy each time a log record corresponding to the item is encountered. For example, an item in the distributed database might have a key with a value "X." Each time a log record corresponding to this item is encountered, the primary key value "X" may be supplied to the hash function. Due to being time-invariant and idempotent, the same output would result each time and all of the corresponding records would be mapped to the same hierarchy (for example, shard hierarchy 512) and the same shard within the hierarchy.

Figure 6:
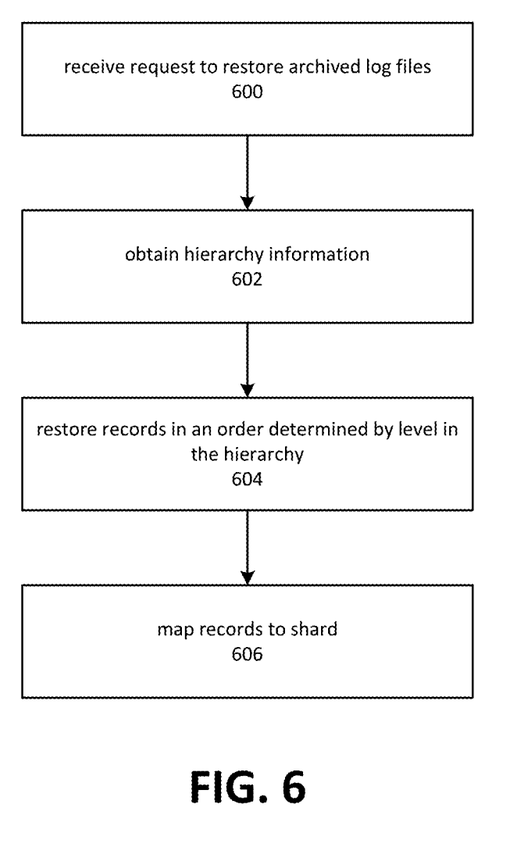
FIG. 6 is a flow diagram depicting an example of retrieving and restoring archived log records.

The restructuring process may be better understood in view of FIG. 6, which is a flow diagram depicting an example of retrieving and restoring archived log records. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 600 depicts receiving a request to restore archived log files. For example, referring to FIG. 1, the restoration module 108 may receive a transmitted message, or some other indication, that it should restore a previously archived set of log records. The message or other indication might also contain information describing the target of the restoration, such as the distributed database 110 depicted in FIG. 1.

The restoration module 108 may also obtain hierarchy information, as depicted by block 602. This information may include data describing the hierarchy of the shards on which the archived log files are based.

Block 604 depicts restoring records in an order that is determined by the level in the hierarchy of shards with which the log record is associated. Replaying the log records in this order may ensure correctness of the restored data in cases where data integrity is affected by the hierarchical relationship. The replay may comprise first replaying all records associated with the root of the hierarchy, and then all of the records associated with shards that are immediate children of the root level, and then all of the records associated with their children, and so on. In some instances, the replay may proceed in the reverse direction, starting with all records associated with shards at the bottom of the hierarchy and then proceeding towards the root.

As depicted by block 606, the log records may be mapped to shards based on a hash value. The hash value may have been stored with the archived log record. The hash function might also, in some instances, be obtained by applying a hash function to a portion of each record, such as a primary key value. The portion of the record used for this purpose may be the same as was applied during the archiving process. The restoration module 108 may use the process depicted in FIG. 5 to map from the hash value to one of the hash space regions 502-506, and to a shard within the mapped hash space region.

Figure 7:
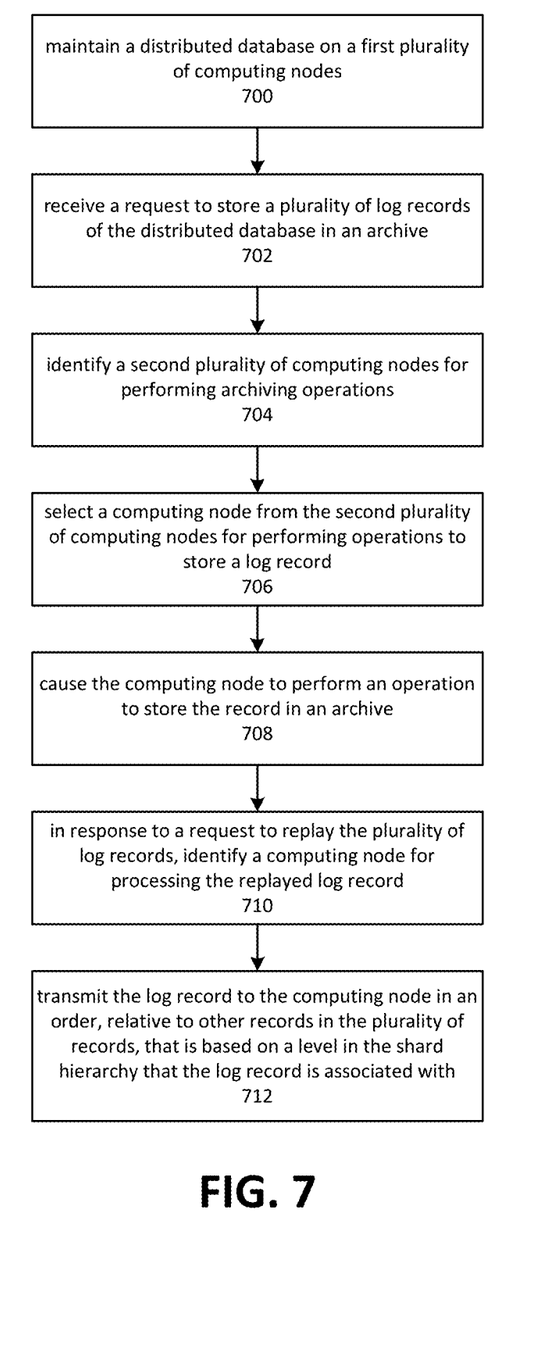
FIG. 7 is a flow diagram depicting an example of a process for archiving and replaying log records.

Aspects of the present disclosure may be better understood in view of FIG. 7, which is a flow diagram depicting an example of a process for archiving and replaying log records. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 700 depicts maintaining a distributed database on a first plurality of computing nodes. The computing nodes may each maintain one or more shards of the distributed database, and there may be a transaction log associated with each shard.

Block 702 depicts receiving a request to store a plurality of log records in an archive. The plurality of log records may correspond to some or all of the entries in the transaction logs of the various shards of the distributed database. In some instances, the request might be time-bound, so that only those log records from a particular period of time are to be archived.

Block 704 depicts identifying a second plurality of computing nodes for performing the archiving operations in parallel. The number of computing nodes in this second group may be greater than those in the distributed database by some amount. In some instances, the number of computing nodes may be proportional to those in the distributed database by a specified or implied concurrency parameter.

Block 706 depicts selecting a computing node, from the second plurality of computing nodes, for performing operations to store a log record. The computing node may be selected based on a hash function and a concurrency parameter that indicates the degree of parallelism to be employed in archiving the log records. The concurrency factor may be used, for example, as a basis for subdividing the output of the hash function into a number of regions of hash space.

Block 708 depicts causing the selected computing node to perform the operation to store the record. This may include transmitting the log record to the selected computing node, where a component module of the archiving process may receive and process the request.

Block 710 depicts identifying a computing node to process a replayed log record. The computing node may be associated with a shard of the distributed database. The operation depicted by block 710 may be performed in response to receiving a request to replay the plurality of log records that were archived.

Block 712 depicts transmitting the log record to the identified computing node. The log record may be transmitted in an order that is relative to the transmission of other log records in the plurality of log records that are being replayed. Each log record is associated with the particular shard from whose transaction log the record originated. Accordingly, each record is also associated with a position in a shard hierarchy. Block 712 depicts that replaying the log records may occur in an order that is based on positions in a shard hierarchy. Each of the log records from a first level in the hierarchy may be processed concurrently. However, the processing of each of the log records in this level may be completed prior to moving on to another level. This approach may help to ensure that the replay produces consistent data.

Figure 8:
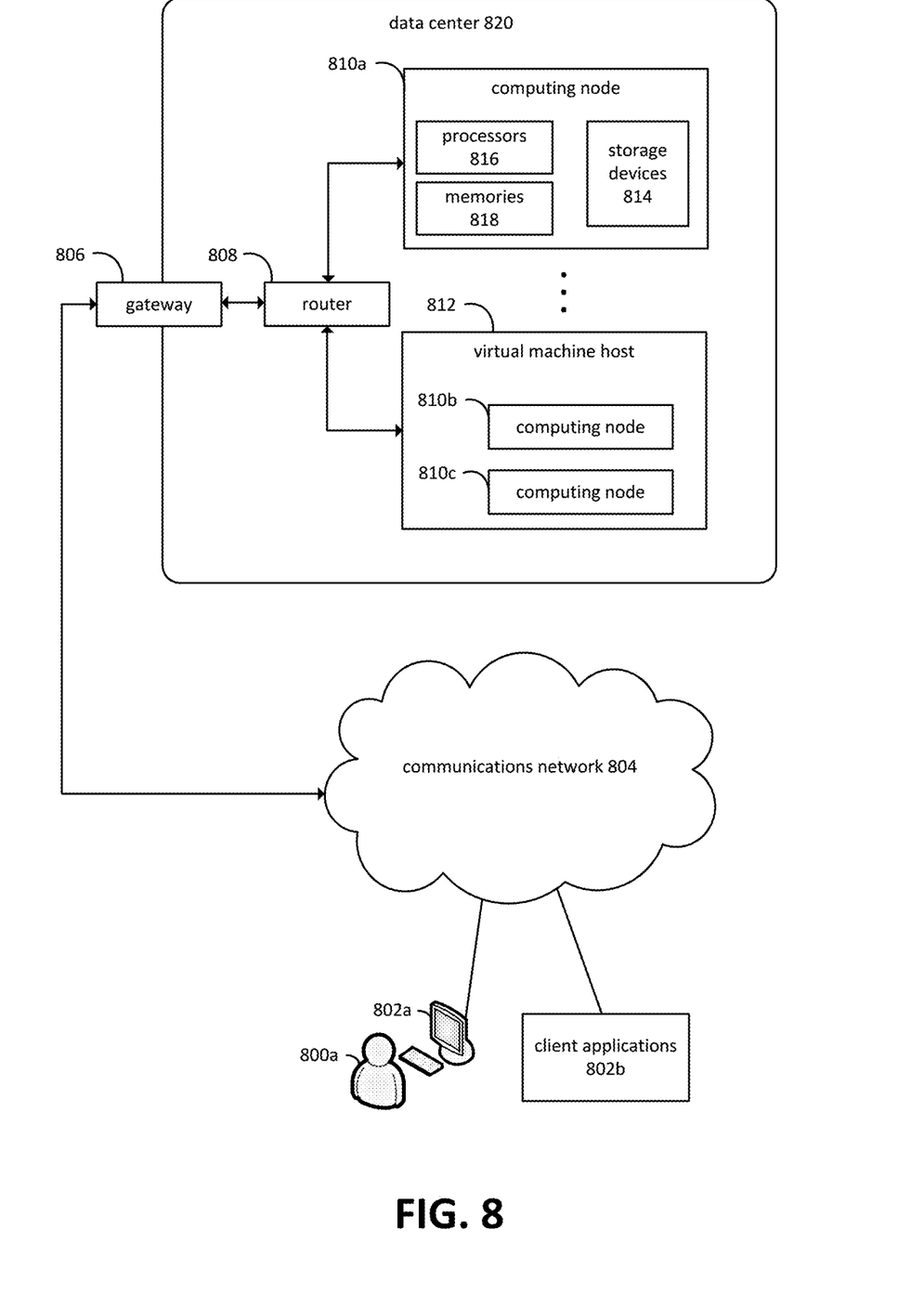
FIG. 8 is a block diagram depicting an embodiment of a computing environment in which aspects of the present disclosure may be practiced.

FIG. 8 is a diagram depicting an example of a distributed computing environment on which aspects of the present invention may be practiced. Various users 800*a* may interact with various client applications, operating on any type of computing device 802*a*, to communicate over communications network 804 with processes executing on various computing nodes 810*a*, 810*b*, and 810*c* within a data center 820. Alternatively, client applications 802*b* may communicate without user intervention. Communications network 804 may comprise any combination of communications technology, including the Internet, wired and wireless local area networks, fiber optic networks, satellite communications, and so forth. Any number of networking protocols may be employed.

Communication with processes executing on the computing nodes 810*a*, 810*b*, and 810*c*, operating within data center 820, may be provided via gateway 806 and router 808. Numerous other network configurations may also be employed. Although not explicitly depicted in FIG. 8, various authentication mechanisms, web service layers, business objects, or other intermediate layers may be provided to mediate communication with the processes executing on computing nodes 810*a*, 810*b*, and 810*c*. Some of these intermediate layers may themselves comprise processes executing on one or more of the computing nodes. Computing nodes 810*a*, 810*b*, and 810*c*, and processes executing thereon, may also communicate with each other via router 808. Alternatively, separate communication paths may be employed. In some embodiments, data center 820 may be configured to communicate with additional data centers, such that the computing nodes and processes executing thereon may communicate with computing nodes and processes operating within other data centers.

Computing node 810*a* is depicted as residing on physical hardware comprising one or more processors 816, one or more memories 818, and one or more storage devices 814. Processes on computing node 810*a* may execute in conjunction with an operating system or alternatively may execute as a bare-metal process that directly interacts with physical resources, such as processors 816, memories 818, or storage devices 814.

Computing nodes 810*b* and 810*c* are depicted as operating on virtual machine host 812, which may provide shared access to various physical resources, such as physical processors, memory, and storage devices. Any number of virtualization mechanisms might be employed to host the computing nodes.

The various computing nodes depicted in FIG. 8 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 9:
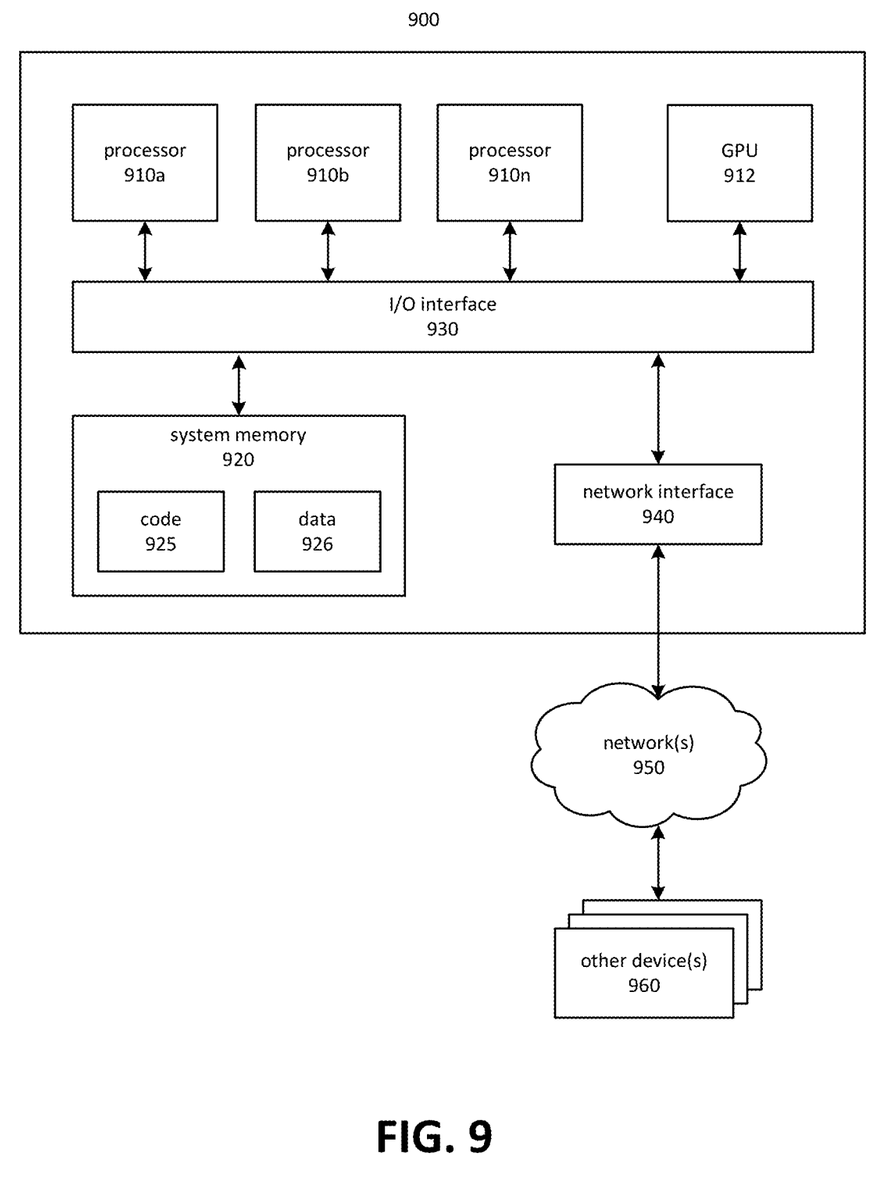
FIG. 9 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 9 depicts a general-purpose computer system that includes or is configured to access one or more computer-accessible media. In the illustrated embodiment, computing device 900 includes one or more processors 910*a*, 910*b*, and/or 910*n* (which may be referred herein singularly as a processor 910 or in the plural as the processors 910) coupled to a system memory 920 via an input/output ("I/O") interface 930. Computing device 900 further includes a network interface 940 coupled to I/O interface 930.

In various embodiments, computing device 900 may be a uniprocessor system including one processor 910 or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures ("ISAs"), such as the x86, PowerPC, SPARC or MIPS ISAs, or any other suitable ISA. In multiprocessor systems, each of processors 910 may commonly, but not necessarily, implement the same ISA.

In some embodiments, a graphics processing unit ("GPU") 912 may participate in providing graphics rendering and/or physics processing capabilities. A GPU may, for example, comprise a highly parallelized processor architecture specialized for graphical computations. In some embodiments, processors 910 and GPU 912 may be implemented as one or more of the same type of device.

System memory 920 may be configured to store instructions and data accessible by processor(s) 910. In various embodiments, system memory 920 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 920 as code 925 and data 926.

In one embodiment, I/O interface 930 may be configured to coordinate I/O traffic between processor 910, system memory 920, and any peripherals in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect ("PCI") bus standard or the Universal Serial Bus ("USB") standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computing device 900 and other device or devices 960 attached to a network or networks 950, such as other computer systems or devices, for example. In various embodiments, network interface 940 may support communication via any suitable wired or wireless general data networks, such as types of Ethernet networks, for example. Additionally, network interface 940 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 920 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 900 via I/O interface 930. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 900 as system memory 920 or another type of memory. Further, a computer-accessible medium may include transmission media or signals, such as electrical, electromagnetic or digital signals, conveyed via a communication medium, such as a network and/or a wireless link, such as those that may be implemented via network interface 940. Portions or all of multiple computing devices, such as those illustrated in FIG. 9, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method, comprising:
    obtaining a request to store data associated with a distributed database;
    in response to the request, storing the data based at least in part on one or more operations performed using a concurrency parameter and a hash function applied to at least a portion of the data, wherein the data is stored with information indicative of a position of the data in a storage hierarchy of the distributed database;
    obtaining a request to retrieve the stored data;
    in response to the request to retrieve the stored data, applying the hash function to the portion of the data to generate a hash value;
    identifying a computing node to obtain the stored data based on the hash value;
    retrieving the stored data; and
    storing the retrieved stored data on the computing node.

2. The method according to claim 1, wherein the concurrency parameter defines a degree of parallelism for storing the data.

3. The method according to claim 1, further comprising receiving the concurrency parameter in conjunction with the request to store the data associated with the distributed database, wherein the request to store the data is a request to archive the data stored in the distributed database.

4. The method according to claim 1, wherein the data comprises at least one log record of the distributed database.

5. The method according to claim 1, wherein the information indicative of the position of the data is based on an application of the hash function to the portion of the data.

6. The method according to claim 1, further comprising, in response to the request to store the data, applying the information indicative of the position of the data in the storage hierarchy to the data, wherein the information indicative of the position of the data in the storage hierarchy comprises information indicating a position of a shard in the storage hierarchy, and wherein the shard is a source of the data being stored.

7. The method according to claim 6, wherein
    applying the information indicative of the position of the data in the storage hierarchy to the data comprises applying the hash function to a key associated with the data.

8. A record archiving method, comprising:
    receiving a request to generate an archive of a record stored by a distributed database;
    in response to the request to generate an archive of the record, archiving the record based at least in part on one or more operations performed using a degree of parallelism in accordance with a concurrency parameter and a hash function applied to at least a portion of the record, wherein the record is archived with information indicative of a stored position of the record in a hierarchy of storage entities of the distributed database;
    obtaining a request to retrieve the archived record;
    in response to the request to retrieve the archived record, applying the hash function to the portion of the archived record to generate a hash value;
    identifying a storage entity to obtain the archived record based on the hash value;
    retrieving the archived record; and
    storing the retrieved archived record on the storage entity.

9. The method according to claim 8, wherein the record is an entry in a transaction log maintained by the distributed database, the transaction log comprising a history of changes made to data maintained by the hierarchy of storage entities of the distributed database.

10. The method according to claim 8, further comprising receiving the concurrency parameter in conjunction with the request to generate the archive of the record stored by the distributed database.

11. The method according to claim 8, wherein the information indicative of the stored position of the record is based on an application of the hash function to the portion of the record.

12. The method according to claim 8, further comprising, in response to the request to generate an archive of the record, applying the information indicative of the stored position of the record to the record, wherein the information indicative of the stored position of the record in the hierarchy of storage entities comprises information indicating a position of a storage entity in the hierarchy of storage entities, and wherein the storage entity is a source of the record being archived.

13. The method according to claim 12, wherein applying the information indicative of the stored position of the record to the record comprises applying the hash function to a primary key of the record.

14. The method according to claim 8, wherein archiving the record comprises selecting a computing node of a plurality of computing nodes for performing an operation to store the record, the computing node selected based at least in part on the information indicative of the stored position of the record in the hierarchy of storage entities of the distributed database.

15. The method according to claim 14, further comprising causing the computing node to store the record with the information indicative of the stored position of the record in the hierarchy of storage entities of the distributed database, wherein the information indicative of the stored position of the record in the hierarchy of storage entities is based on an application of the hash function to the portion of the record.

16. A record replay method for a distributed database, the method comprising:
    obtaining a request to replay a plurality of records stored in an archive associated with computer storage;
    in response to the request, mapping a record of the plurality of records to a shard of a distributed database at least based on a mapping mechanism associated with the record and a hash function applied to at least a portion of the record, the shard of the distributed database selected based at least in part on applying the hash function to at least the portion of the record to generate a hash value used to identify the shard of the distributed database, and wherein the mapping mechanism is defined at least based on a level of concurrency; and
    storing the record in the shard.

17. The method according to claim 16, wherein the mapping mechanism associated with the record is based on an application of the hash function already associated with the record when the request to replay is obtained.

18. The method according to claim 16, further comprising, in response to the request, applying the mapping mechanism to the record, the mapping mechanism based on an application of the hash function applied to a key of the record, the hash function to provide an output comprising a hash space including a plurality of hash space regions based on the level of concurrency, wherein the shard is associated with one of the plurality of hash space regions.

19. The method according to claim 16, wherein in the level of concurrency is a multiplying factor useable to define a plurality of threads to process the request to replay the plurality of records stored in the archive.

20. The method according to claim 19, wherein the multiplying factor corresponds to a number of shards of the distributed database.

* * * * *